(12) United States Patent
Choi et al.

(10) Patent No.: US 8,681,985 B2
(45) Date of Patent: Mar. 25, 2014

(54) MASKING OPERATION METHOD AND DEVICE FOR SYMMETRIC KEY ENCRYPTED SYSTEM

(75) Inventors: Doo Ho Choi, Daejeon (KR); Yong-Je Choi, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 267 days.

(21) Appl. No.: 12/872,953

(22) Filed: Aug. 31, 2010

(65) Prior Publication Data

US 2011/0176678 A1     Jul. 21, 2011

(30) Foreign Application Priority Data

Jan. 20, 2010 (KR) .................. 10-2010-0005175

(51) Int. Cl.
*H04L 9/00*   (2006.01)
(52) U.S. Cl.
USPC ........................................................... 380/259
(58) Field of Classification Search
USPC ........................................................... 380/259
See application file for complete search history.

(56) References Cited

U.S. PATENT DOCUMENTS

| 6,295,606 B1 | 9/2001 | Messerges et al. |
| 7,334,133 B2 | 2/2008 | Goubin |
| 7,822,196 B2 * | 10/2010 | Matsui et al. ................. 380/28 |
| 2007/0064930 A1 | 3/2007 | Fischer |
| 2008/0019503 A1 | 1/2008 | Dupaquis et al. |

FOREIGN PATENT DOCUMENTS

| EP | 1 724 961 | 11/2006 |
| KR | 10-2008-0073345 A | 8/2008 |

OTHER PUBLICATIONS

Louis Goubin, "A Sound Method for Switching between Boolean and Arithmetic Masking", CHES 2001, 2001, pp. 3-15, No. 2162, Springer-Verlag Berlin Heidelberg.
Jean-Sébastien Coron et al., "A New Algorithm for Switching from Arithmetic to Boolean Masking", CHES 2003, 2003, pp. 89-97, No. 2779, Springer-Verlag Berlin Heidelberg.
Olaf Neiβe et al., "Switching Blindings with a View Towards IDEA", CHES 2004, 2004, pp. 230-239, No. 3156, International Association for Cryptologic Research.

* cited by examiner

*Primary Examiner* — Andrew Georgandellis

(57) ABSTRACT

A masking operation method for a symmetric key encryption system includes, when at least two Substitution-boxes (S-boxes) are input, generating a masking S-box table for one S-box which was input; and performing an operation on one masking S-box by referring to the generated masking S-box table. Further, the masking operation method for the symmetric key encryption system includes performing an operation on a remaining masking S-box for a remaining S-box, which was input, by referring to the masking S-box table.

15 Claims, 1 Drawing Sheet

MASKING OPERATION METHOD AND DEVICE FOR SYMMETRIC KEY ENCRYPTED SYSTEM

CROSS-REFERENCE TO RELATED APPLICATIONS

The present invention claims priority of Korean Patent Application No. 10-2010-0005175 filed on Jan. 20, 2010, which is incorporated herein by reference.

FIELD OF THE INVENTION

The present invention relates to a symmetric key encryption technique which has a good countermeasure against a side channel attack; particularly, to a masking operation method for a symmetric key encryption system, which is suitable for reducing the resources, e.g., time and memory capacity required to generate a masking Substitution-box (S-box) table applied to the symmetric key encryption technique.

BACKGROUND OF THE INVENTION

A side channel attack is one among powerful techniques used to attack encryption algorithms, and such a side channel attack technique has gradually become a great threat to security products. In particular, a power/electromagnetic side channel analysis attack is an attack method of collecting power consumption or electromagnetic waves generated when an encryption algorithm run, and analyzing the secret information (mainly, key information) of the encryption algorithm by performing statistical analysis on the collected power consumption or electromagnetic waves.

Various preventative techniques have been proposed to prevent such a power/electromagnetic side channel analysis attack, and a masking technique is a representative method of preventing the side channel analysis attack using an algorithm. The masking technique is a method of adding random data to original data desired to be encrypted or performing a logical operation, for example, an exclusive OR (XOR) operation, on the original data, so that it is difficult to extract secret information even though statistical analysis is performed on the collected power wave data or electromagnetic wave data.

However, in a symmetric key encryption algorithm, for example, ARIA or SEED encryption algorithm, applied to use such a masking technique, at least two or more masking S-box tables, which are masking look-up tables used in a symmetric key encryption system, need to be generated and stored, so that there is a problem in that resources required for the masking operation, for example, operation time and memory capacity, are excessively consumed.

SUMMARY OF THE INVENTION

In view of the above, the present invention provides a masking operation technique for a symmetric key encryption system, which performs an operation on one masking S-box by referring to an initially generated masking S-box table, and then performs an operation on a remaining masking S-box by referring to the initially generated masking S-box table instead of referring to an additional masking S-box table, so that operation time and memory capacity, which are required for a masking operation, can be reduced.

In accordance with a first aspect of the present invention, there is provided a masking operation method for a symmetric key encryption system, including: when at least two Substitution-boxes (S-boxes) are input, generating a masking S-box table for one S-box which was input; performing an operation on one masking S-box by referring to the generated masking S-box table; and performing an operation on a remaining masking S-box for a remaining S-box, which was input, by referring to the masking S-box table.

In accordance with a second aspect of the present invention, there is provided a masking operation device for a symmetric key encryption system, including: a masking S-box table generation unit for generating a masking S-box table for one S-box of at least two input S-boxes; and a masking S-box operation unit for performing an operation on one masking S-box for the one S-box and a remaining masking S-box for a remaining S-box of the at least two S-boxes by referring to the masking S-box table generated by the masking S-box table generation unit.

In accordance with the present invention, a masking operation technique based on the efficiency of a masking S-box table used in a symmetric key encryption algorithm in conformity with national standard algorithms, for example, the SEED encryption algorithm, is prepared, so that operation time and memory capacity necessary for the masking operation may be reduced to 50% or more, thereby increasing the operational efficiency and reliability of products to which the symmetric key encryption algorithm is applied, for example, smart cards.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

A masking operation technique for a symmetric key encryption system, to which the SEED encryption algorithm selected from among the symmetric key encryption algorithms is applied, will be described as an example in an embodiment below. Here, the masking operation, for example, an arithmetical masking operation or a logical masking operation, in particular, an XOR masking operation, will be described as an example.

Hereinafter, embodiments of the present invention will be described in detail with reference to the accompanying drawing which form a part hereof.

Figure 1:
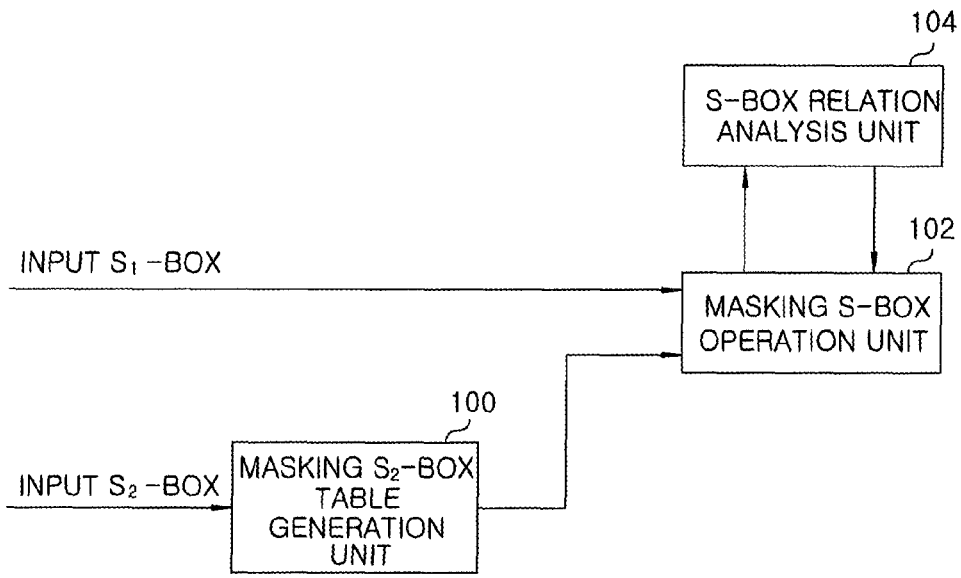
FIG. 1 is a block diagram schematically showing a masking operation device for a symmetric key encryption system in accordance with an embodiment of the present invention.

FIG. 1 is block diagram showing a masking operation (for example, an XOR masking operation) device for a symmetric key encryption system in accordance with the embodiment of the present invention, which includes a masking $S_2$-box table generation unit 100, a masking S-box operation unit 102, and an S-box relation analysis unit 104.

First, the masking operation device for the SEED encryption system of the symmetric key encryption system is described as an example in the present embodiment, and two S-boxes (a first S-box $s_1[x]$ and a second S-box $s_2[x]$) may be used in the SEED encryption system as shown in the following Equation 1.

$$s_1[x] = A_1 x^{247} \oplus b_1 = A_1 x^{-8} \oplus b_1, b_1 = 0XA9$$

$$s_2[x] = A_2 x^{251} \oplus b_2 = A_2 x^{-4} \oplus b_2, b_2 = 0X38 \quad \text{[Equation 1]}$$

where, $A_1$ and $A_2$ are 8-bit values as shown in the following Equation 2, and operations may be performed thereon by regarding the $A_1$ and $A_2$ as the elements of a finite field (here, the primitive polynomial of the finite field may be, e.g., $p(x) = x^8 + x^6 + x^5 + x + 1$).

$$A_1 = \begin{bmatrix} 10001010 \\ 11111110 \\ 10000101 \\ 01000010 \\ 01000101 \\ 00100001 \\ 10001000 \\ 00010100 \end{bmatrix}, A_2 = \begin{bmatrix} 01000101 \\ 10000101 \\ 11111110 \\ 00100001 \\ 10001010 \\ 10001000 \\ 01000010 \\ 00010100 \end{bmatrix} \quad \text{[Equation 2]}$$

In order to realize the masking operation for the SEED encryption system, most of the values of the S-box are previously calculated in the form of a look-up table and then an S-box table in the form of the look-up table is referred to.

Under such an assumption, the masking operation device for the symmetric key encryption system will be described as an example.

Unlike the conventional art which includes separate masking S-box table generation units for generating respective masking S-box tables for the input of S-boxes 'a first S-box $s_1[x]$ and a second S-box $s_2[x]$', and which performs operations on respective masking S-boxes, the embodiment shown in FIG. 1 has principle features of including a single masking S-box table generation unit, performing an operation on an initial one masking S-box, and performing an operation on a remaining masking S-box by referring to a masking S-box table generated by the single masking S-box table generation unit.

Although the single masking S-box table generation unit is described as the masking $S_2$-box table generation unit 100 for receiving the second S-box $s_2[x]$ in the embodiment of FIG. 1, this is given just as an example. Alternatively, for example, the single masking S-box table generation unit may be described as a masking S-box table generation unit for receiving the first S-box $s_1[x]$.

As shown in FIG. 1, the masking $S_2$-box table generation unit 100 functions to generate and store a second masking S-box table '$MS_2$-box table' for the input second S-box $s_2[x]$. Although not shown in the drawing, a second masking S-box table '$MS_2$-box table' to be generated may be stored in a separate storage unit, for example, Read Only Memory (ROM). Since these facts should be known by those skilled in the art, the detailed description thereof will be omitted.

The masking S-box operation unit 102 in accordance with the embodiment of the present invention may function to perform an operation on a second masking S-box by referring to the second masking S-box table '$MS_2$-box table' generated by the masking $S_2$-box table generation unit 100, and to perform an operation on a first masking S-box for the first S-box $s_1[x]$, which is a remaining S-box, by referring to the second masking S-box table '$MS_2$-box table'. Specifically, the masking S-box operation unit 102 may perform an operation on the additional first masking S-box using the relation between the second S-box $s_2[x]$ and the first S-box $s_1[x]$ through the connection with the S-box relation analysis unit 104 which will be described later.

The S-box relation analysis unit 104 may analyze the relation between the initial masking S-box 'second S-box $s_2[x]$' and the first S-box $s_1[x]$, the operation of which is performed by the masking S-box operation unit 102, and may provide the results of the analysis to the masking S-box operation unit 102.

The functions, performed by the masking S-box operation unit 102 and the S-box relation analysis unit 104, and a process of realizing the functions will be described in detail in the flow chart of FIG. 2.

Hereinafter, with the above-described configuration, a masking operation method for a symmetric key encryption system in accordance with the embodiment of the present invention will be described in detail with reference to the flow chart in FIG. 2.

Figure 2:
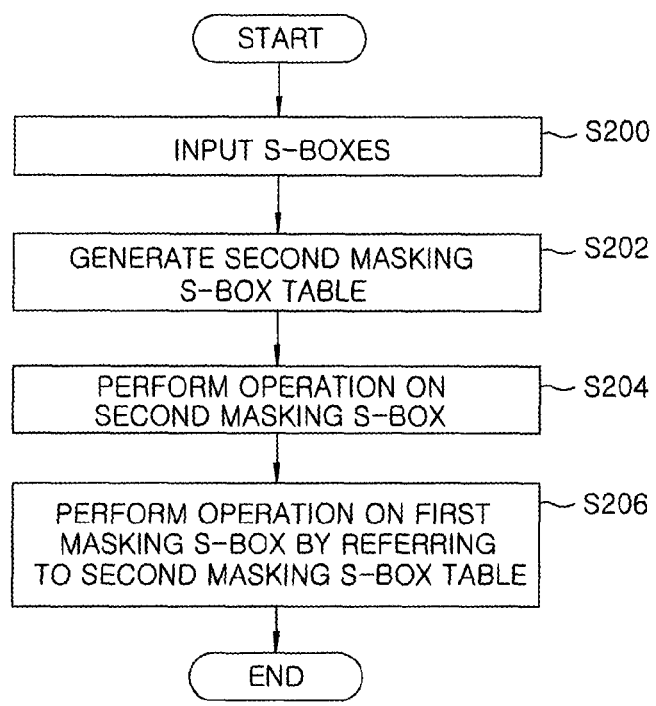
FIG. 2 is a flow chart showing a masking operation method for a symmetric key encryption system in accordance with the embodiment of the present invention.

As shown in FIG. 2, when S-boxes, that is, the first S-box $s_1[x]$ and the second S-box $s_2[x]$, are input in step S200, the masking $S_2$-box table generation unit 100 may generate a second masking S-box table for the input second S-box $s_2[x]$ in step S202.

The second masking S-box table can be realized using the following Equation 3.

Input: SEED S-box $S_2, r, r'$

Output: MS table $MS_{2,r,r'}[j], j=0, \ldots, 255$ for $j=0$ to 255 do $j' \leftarrow j \delta r \bmod 2^8$ $MS_{2,r,r'}[j] \leftarrow S_2[j'] \oplus r'$ end for return $MS_{2,r,r'}[\ ]$ [Equation 3]

The masking S-box operation unit 102 may perform an operation on a second masking S-box by referring to the second masking S-box table generated by the masking $S_2$-box table generation unit 100 in step S204.

Here, unlike the conventional art which performs an operation on a masking S-box using an additional masking S-box table for the input of a first S-box, the masking S-box operation unit 102 may perform an operation on a first masking S-box for the input of the first S-box by referring to the already generated second masking S-box table in step S206.

The operation performed on the first masking S-box may be realized using the following Equation 4.

Input: $x', r, r'$, where $x' = \oplus r$

Output: $y$ such that $y = S_1|x| \oplus r'$ $y \leftarrow A_3 MS_{2,r,r'}[x']$ $y \leftarrow y \oplus b_3$ $m_a \leftarrow A_3 r'$ $m_a \leftarrow m_a \leftarrow r'$ $y \leftarrow y \oplus m_a$ return $y$ [Equation 4]

Specifically, the masking S-box operation unit 102 may perform an operation on the first masking S-box in accordance with the results of the analysis of the relation between the second S-box $s_2[x]$ and the first S-box $s_1[x]$, the analysis being performed by the S-box relation analysis unit 104. Here, the relation between the second S-box $s_2[X]$ and the first S-box $s_1[x]$ may be realized using the following Equation 5.

$$s_1[x] = A_1(x^{-4})^2 \oplus b_1 \quad \text{[Equation 5]}$$
$$= A_1(A_2^{-1}(S_2[x] \oplus b_2))^2 \oplus b_1$$
$$= A_1(B(A_2^{-1}(S_2[x] \oplus b_2))) \oplus b_1$$
$$= (A_1 B A_2^{-1})S_2[x] \oplus ((A_1 B A_2^{-1})b_2 \oplus b_1$$
$$= A_3 S_2[x] \oplus b_3$$

where, B, $A_3$, and $b_3$ can be represented by the following Equation 6.

$$B = \begin{bmatrix} 00100000 \\ 10111000 \\ 10110000 \\ 01000100 \\ 01100000 \\ 10100010 \\ 00110000 \\ 01110001 \end{bmatrix}, A_3 = \begin{bmatrix} 10010001 \\ 00001001 \\ 01100100 \\ 00000100 \\ 11011000 \\ 11110111 \\ 00001110 \\ 01010010 \end{bmatrix}, B_3 = 0 \times 4a \quad \text{[Equation 6]}$$

Therefore, since an additional masking S-box table is not required in the present embodiment, operation time and memory capacity necessary for the masking operation can be reduced.

Meanwhile, if the above-described relations of Equations 5 and 6 are applied to the masking S-boxes, a relation like the following Equation 7 may be induced.

$$Ms_{1,r,r'}[x'] = S_1[x' \oplus r] \oplus r' \quad \text{[Equation 7]}$$
$$= (A_3 S_2[x' \oplus r] \oplus b_3) \oplus r'$$
$$= (A_3(MS_{2,r,r'}[x'] \oplus r') \oplus b_3) \oplus r'$$
$$= A_3 MS_{2,r,r'}[x'] \oplus A_3 r' \oplus b_3 \oplus r'$$
$$= A_3 MS_{2,r,r'}[x'] \oplus m_a \oplus b_3,$$

where
$$m_a = A_3 r' \oplus r'$$

As described above, in accordance with the embodiment of the present embodiment, a masking S-box table is generated and stored for only one S-box, and the operation on a remaining masking S-box is performed using the relation between S-boxes having inputs which are different from each other.

While the invention has been shown and described with respect to the embodiments, it will be understood by those skilled in the art that various changes and modifications may be made without departing from the scope of the invention as defined in the following claims.

What is claimed is:

1. A masking operation method for a symmetric key encryption system, comprising:
   generating, for a second Substitution-box (S-box), a masking S-box table;
   performing a second masking S-box operation on the second S-box by using the generated masking S-box table; and
   performing a first masking S-box operation on a first S-box by using the generated masking S-box table;
   wherein the first masking S-box operation is performed using a relation between the first S-box and the second S-box, the relation determined by the following equation $$s_1[x] = A_1(x^{-4})^2 \oplus b_1$$
$$= A_1(A_2^{-1}(S_2[x] \oplus b_2))^2 \oplus b_1$$
$$= A_1(B(A_2^{-1}(S_2[x] \oplus b_2))) \oplus b_1$$
$$= (A_1 B A_2^{-1})S_2[x] \oplus ((A_1 B A_2^{-1})b_2 \oplus b_1$$
$$= A_3 S_2[x] \oplus b_3$$

where $s_1[x]$ is the first S-box, and $s_2[x]$ is the second S-box.

2. The masking operation method of claim 1, wherein the first masking S-box operation and the second masking S-box operation are related to each other according to the following equation:

$$Ms_{1,r,r'}[x'] = S_1[x' \oplus r] \oplus r'$$
$$= (A_3 S_2[x' \oplus r] \oplus b_3) \oplus r'$$
$$= (A_3(MS_{2,r,r'}[x'] \oplus r') \oplus b_3) \oplus r'$$
$$= A_3 MS_{2,r,r'}[x'] \oplus A_3 r' \oplus b_3 \oplus r'$$
$$= A_3 MS_{2,r,r'}[x'] \oplus m_a \oplus b_3,$$

where
$$m_a = A_3 r' \oplus r'.$$

where $Ms_{1,r,r'}[x']$ represents the first masking S-box operation, and $MS_{2,r,r'}[x']$ represents the second masking S-box operation.

3. The masking operation method of claim 1, further comprising storing the masking S-box table.

4. The masking operation method of claim 1, wherein the at least two S-boxes include 8-bit input values.

5. The masking operation method of claim 1, wherein the symmetric key encryption system is a SEED encryption system.

6. The masking operation method of claim 1, wherein the symmetric key encryption system is an ARIA encryption system.

7. The masking operation method of claim 1, wherein the first and second masking S-box operations are logical masking operations.

8. The masking operation method of claim 1, wherein the first and second masking S-box operations are arithmetic masking operations.

9. A masking operation device for a symmetric key encryption system, comprising:
   a masking S-box table generation unit configured to generate a masking S-box table for a second S-box;
   a memory storing the masking S-box table for the second S-box;
   an S-box relation analysis unit configured to determine a relation between a first S-box and the second S-box; and
   a masking S-box operation unit configured to
      perform a second masking S-box operation for the second S-box by using the masking S-box table for the second S-box generated by the masking S-box table generating unit, and
      perform a first masking S-box operation for the first S-box by using the masking S-box table generated by the masking S-box table generation unit,
      wherein the first masking S-box operation is performed using a relation between the first S-box and the second S-box, the relation determined by the S-box relation analysis unit using the following equation $$s_1[x] = A_1(x^{-4})^2 \oplus b_1$$
$$= A_1(A_2^{-1}(S_2[x] \oplus b_2))^2 \oplus b_1$$
$$= A_1(B(A_2^{-1}(S_2[x] \oplus b_2))) \oplus b_1$$
$$= (A_1 B A_2^{-1})S_2[x] \oplus ((A_1 B A_2^{-1})b_2 \oplus b_1$$
$$= A_3 S_2[x] \oplus b_3$$

where $s_1[x]$ is the first S-box, and $s_2[x]$ is the second S-box.

10. The masking operation device of claim 9, wherein the first masking S-box operation and the second masking S-box operation are related to each other according to the following equation:

$$Ms_{1,r,r'}[x'] = S_1[x' \oplus r] \oplus r'$$
$$= (A_3 S_2[x' \oplus r] \oplus b_3) \oplus r'$$
$$= (A_3(MS_{2,r,r'}[x'] \oplus r') \oplus b_3) \oplus r'$$
$$= A_3 MS_{2,r,r'}[x'] \oplus A_3 r' \oplus b_3 \oplus r'$$
$$= A_3 MS_{2,r,r'}[x'] \oplus m_a \oplus b_3,$$

where $$m_a = A_3 r' \oplus r'$$

where $Ms_{1,r,r'}[x']$ represents the first masking S-box operation, and $MS_{2,r,r'}[x']$ represents the second masking S-box operation.

11. The masking operation device of claim 9, wherein the at least two S-boxes include 8-bit input values.

12. The masking operation device of claim 9, wherein the symmetric key encryption system is a SEED encryption system.

13. The masking operation device of claim 9, wherein the symmetric key encryption system is an ARIA encryption system.

14. The masking operation device of claim 9, wherein the first and second masking S-box operations are logical masking operations.

15. The masking operation device of claim 9, wherein the first and second masking S-box operations are arithmetical masking operations.

* * * * *